US012003125B2

(12) United States Patent
Huber et al.

(10) Patent No.: US 12,003,125 B2
(45) Date of Patent: Jun. 4, 2024

(54) TOOL CIRCUITRY FOR SERIES-TYPE CONNECTED BATTERY PACKS

(71) Applicant: MILWAUKEE ELECTRIC TOOL CORPORATION, Brookfield, WI (US)

(72) Inventors: Alex Huber, Menomonee Falls, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/568,285

(22) Filed: Jan. 4, 2022

(65) Prior Publication Data

US 2022/0131397 A1     Apr. 28, 2022

Related U.S. Application Data

(62) Division of application No. 16/387,786, filed on Apr. 18, 2019, now Pat. No. 11,218,009.

(Continued)

(51) Int. Cl.
*H02J 7/00*     (2006.01)
*H01M 10/42*     (2006.01)

(52) U.S. Cl.
CPC ......... *H02J 7/0025* (2020.01); *H01M 10/425* (2013.01); *H02J 7/0063* (2013.01);
(Continued)

(58) Field of Classification Search
CPC ...... H02J 7/0025; H02J 7/0063; H02J 7/0013; H01M 10/425; H01M 2010/4271; H01M 2220/30; Y02E 60/10
(Continued)

(56) References Cited

U.S. PATENT DOCUMENTS 4,941,456 A * 7/1990 Wood ................. G02B 23/2476
348/69
5,028,858 A * 7/1991 Schnizler ................ B23B 45/02
320/136

(Continued)

FOREIGN PATENT DOCUMENTS

CN     101494279 A     7/2009
DE     4120968 A1 *     1/1992     ......... H01M 50/247
(Continued)

OTHER PUBLICATIONS

JP-2014030358A to Tsukamoto et al., (Tsukamoto) (Machine Translation) (Year: 2014).*

(Continued)

*Primary Examiner* — M Baye Diao
(74) *Attorney, Agent, or Firm* — Michael Best & Friedrich LLP

(57) ABSTRACT

An electrical device including a first battery pack receptacle, a second battery pack receptacle, and circuitry including an electronic processor. The first battery pack receptacle is configured to receive a first battery pack. The second battery pack receptacle is configured to receive a second battery pack. The second battery pack is electrically connected in a series-type configuration with the first battery pack. The circuitry is configured to alter a first signal output from the electronic processor to at least one selected from a group consisting of the first battery pack and the second battery pack, and alter a second signal received by the electronic processor from at least one selected from the group consisting of the first battery pack and the second battery pack.

19 Claims, 3 Drawing Sheets

Related U.S. Application Data

(60) Provisional application No. 62/659,555, filed on Apr. 18, 2018.

(52) U.S. Cl.
CPC ............... *H01M 2010/4271* (2013.01); *H01M 2220/30* (2013.01); *H02J 7/0013* (2013.01)

(58) Field of Classification Search
USPC .......................................................... 320/116
See application file for complete search history.

(56) References Cited

U.S. PATENT DOCUMENTS

| | | | | |
|---|---|---|---|---|
| 5,144,217 | A * | 9/1992 | Gardner | H01M 50/213 320/110 |
| 5,563,493 | A * | 10/1996 | Matsuda | H02J 7/0068 361/679.55 |
| 6,104,967 | A * | 8/2000 | Hagen | H02J 7/0047 429/61 |
| 7,385,795 | B2 * | 6/2008 | Denning | H02J 7/0029 388/903 |
| 7,417,405 | B2 * | 8/2008 | Carrier | H01M 10/4257 320/116 |
| 8,813,866 | B2 * | 8/2014 | Suzuki | H02M 1/10 173/2 |
| 9,472,979 | B2 * | 10/2016 | Mergener | H02J 7/0025 |
| 9,618,242 | B2 * | 4/2017 | Lombardo | F24H 15/208 |
| 9,844,310 | B2 * | 12/2017 | Reed | A47L 9/2857 |
| 10,044,197 | B2 * | 8/2018 | Fry | H02J 7/0049 |
| 10,350,727 | B2 * | 7/2019 | Tan | B24B 23/005 |
| 11,095,148 | B2 * | 8/2021 | Mergener | H02J 7/00 |
| 11,218,009 | B2 | 1/2022 | Huber et al. | |
| 11,368,029 | B2 * | 6/2022 | Bakker | H01M 50/213 |
| 11,601,084 | B2 * | 3/2023 | Seman, Jr. | B60L 50/64 |
| 2011/0198103 | A1 * | 8/2011 | Suzuki | H02J 7/0048 173/46 |
| 2013/0020875 | A1 * | 1/2013 | Wozniak | H02J 50/80 307/43 |
| 2014/0265604 | A1 * | 9/2014 | Mergener | H02J 7/0025 307/80 |
| 2015/0017503 | A1 * | 1/2015 | Wang | H01M 10/6553 429/120 |
| 2015/0380959 | A1 * | 12/2015 | Chang | H02J 7/0019 320/118 |
| 2016/0248075 | A1 * | 8/2016 | Cruise | H01M 10/46 |
| 2016/0374525 | A1 * | 12/2016 | Reed | A47L 11/4005 15/412 |
| 2018/0152043 | A1 * | 5/2018 | Geng | H02J 7/34 |
| 2018/0175458 | A1 * | 6/2018 | Radovich | B25F 5/02 |
| 2018/0366954 | A1 * | 12/2018 | Scanzillo | H02J 7/345 |
| 2019/0237715 | A1 * | 8/2019 | Seman, Jr. | H02J 7/0068 |

FOREIGN PATENT DOCUMENTS

| | | | | |
|---|---|---|---|---|
| EP | 3150340 | B1 | 3/2018 | |
| GB | 2506468 | A * | 4/2014 | ............. B60L 1/003 |
| JP | 3740323 | B2 * | 2/2006 | ......... H01M 10/052 |
| JP | 2011218510 | A | 11/2011 | |
| JP | 2014030358 | A * | 2/2014 | ................ H02J 7/00 |
| JP | 2014030358 | A | 2/2014 | |
| JP | 2014233784 | A | 12/2014 | |
| JP | 2016030307 | A | 3/2016 | |
| WO | 2018067986 | A1 | 4/2018 | |

OTHER PUBLICATIONS

International Search Report and Written Opinion for Application No. PCT/US2019/028043 dated Aug. 8, 2019 (15 pages).

* cited by examiner

TOOL CIRCUITRY FOR SERIES-TYPE CONNECTED BATTERY PACKS

RELATED APPLICATIONS

The application is a division of U.S. patent application Ser. No. 16/387,786, filed Apr. 18, 2019, which claims the benefit of U.S. Provisional Patent Application No. 62/659,555, filed Apr. 18, 2018, the entire content of each of which is hereby incorporated by reference.

FIELD OF INVENTION

The present invention relates to battery-powered portable power tools and, more particularly, to such portable power tools powered by multiple series-type connected battery packs.

SUMMARY

One embodiment discloses an electrical device including a first battery pack receptacle, a second battery pack receptacle, and circuitry including an electronic processor. The first battery pack receptacle is configured to receive a first battery pack. The second battery pack receptacle is configured to receive a second battery pack. The second battery pack is electrically connected in a series-type configuration with the first battery pack. The circuitry is configured to alter a first signal output from the electronic processor to at least one selected from a group consisting of the first battery pack and the second battery pack, and alter a second signal received by the electronic processor from at least one selected from the group consisting of the first battery pack and the second battery pack.

Another embodiment discloses an electrical device including a first battery pack receptacle, a second battery pack receptacle, and bypass circuitry. The first battery pack receptacle is configured to receive a first battery pack. The second battery pack receptacle is configured to receive a second battery pack. The second battery pack is electrically connected in a series-type configuration with the first battery pack. The bypass circuitry is configured to bypass the second battery pack receptacle when the second battery pack is not present in the second battery pack receptacle.

Another embodiment discloses an electrical device system including a device housing and an adapter. The device housing includes a first battery pack receptacle and an electronic processor. The adapter is configured to be received by the first battery receptacle. The adapter includes a second battery receptacle configured to receive a first battery pack, a third battery pack receptacle configured to receive a second battery pack, and circuitry. The circuitry is configured to alter a first signal output from the electronic processor to at least one selected from a group consisting of the first battery pack and the second battery pack, and alter a second signal received by the electronic processor from at least one selected from the group consisting of the first battery pack and the second battery pack.

Other independent aspects of the application may become apparent by consideration of the detailed description and accompanying drawings.

Figure 1:
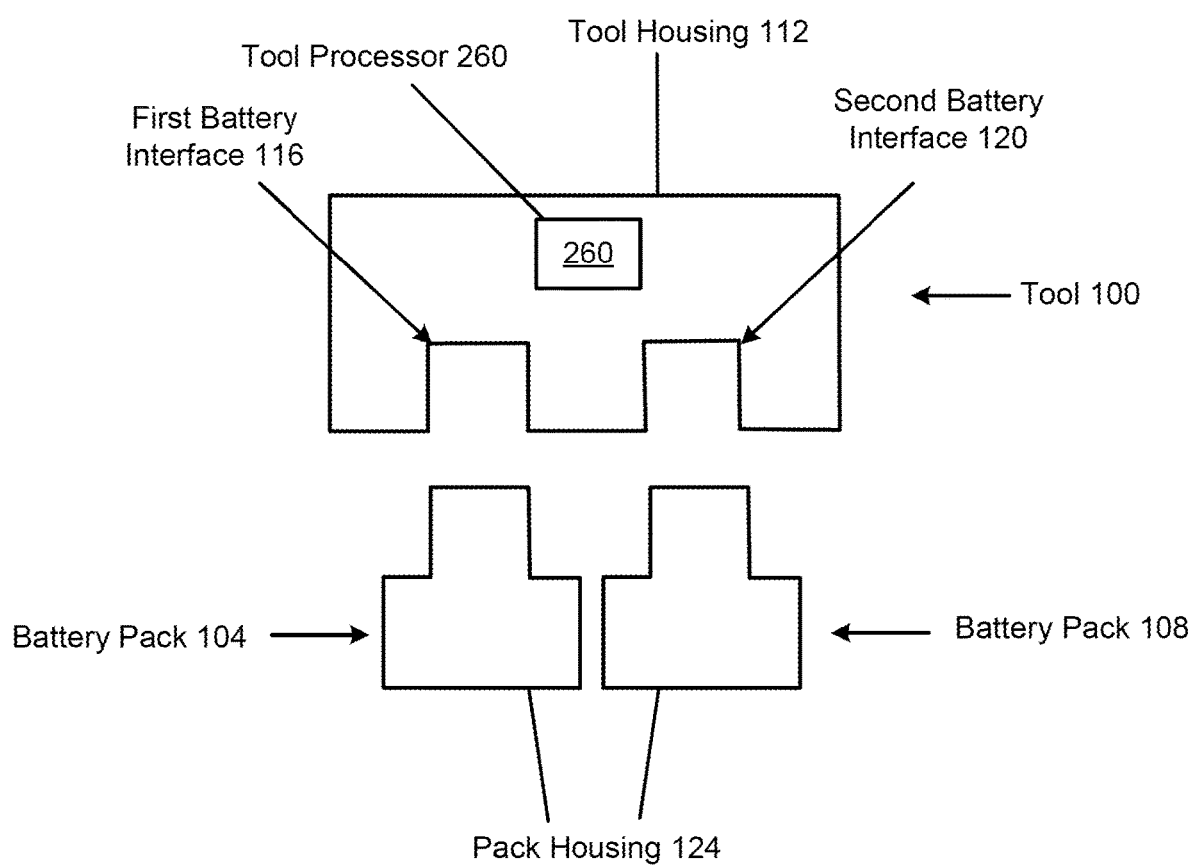
FIG. 1 is a perspective view of an electrical combination including an electrical device, such as a portable power tool, and multiple battery packs operable to power the electrical device.

Before any independent embodiments of the application are explained in detail, it is to be understood that the application is not limited in its application to the details of construction and the arrangement of components set forth in the following description or illustrated in the following drawings. The application is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

The phrase "series-type configuration" as used herein refers to a circuit arrangement in which the described elements are arranged, in general, in a sequential fashion such that the output of one element is coupled to the input of another, though the same current may not pass through each element. For example, in a "series-type configuration," additional circuit elements may be connected in parallel with one or more of the elements in the "series-type configuration." Furthermore, additional circuit elements can be connected at nodes in the series-type configuration such that branches in the circuit are present. Therefore, elements in a series-type configuration do not necessarily form a true "series circuit." Additionally, the phrase "parallel-type configuration" as used herein refers to a circuit arrangement in which the described elements are arranged, in general, in a manner such that one element is connected to another element, such that the circuit forms a parallel branch of the circuit arrangement. In such a configuration, the individual elements of the circuit may not have the same potential difference across them individually. For example, in a parallel-type configuration of the circuit, two circuit elements in parallel with one another may be connected in series with one or more additional elements of the circuit. Therefore, a circuit in a "parallel-type configuration" can include elements that do not necessarily individually form a true "parallel circuit."

DETAILED DESCRIPTION

One embodiment discloses an electrical device including a first battery pack receptacle, a second battery pack receptacle, and circuitry including an electronic processor. The first battery pack receptacle is configured to receive a first battery pack. The second battery pack receptacle is configured to receive a second battery pack. The second battery pack is electrically connected in a series-type configuration with the first battery pack. The circuitry is configured to alter a first signal output from the electronic processor to at least one selected from a group consisting of the first battery pack and the second battery pack, and alter a second signal received by the electronic processor from at least one selected from the group consisting of the first battery pack and the second battery pack.

Another embodiment discloses an electrical device including a first battery pack receptacle, a second battery pack receptacle, and bypass circuitry. The first battery pack receptacle is configured to receive a first battery pack. The second battery pack receptacle is configured to receive a second battery pack. The second battery pack is electrically connected in a series-type configuration with the first battery pack. The bypass circuitry is configured to bypass the second battery pack receptacle when the second battery pack is not present in the second battery pack receptacle.

Another embodiment discloses an electrical device system including a device housing and an adapter. The device housing includes a first battery pack receptacle and an electronic processor. The adapter is configured to be received by the first battery receptacle. The adapter includes a second battery receptacle configured to receive a first battery pack, a third battery pack receptacle configured to receive a second battery pack, and circuitry. The circuitry is configured to alter a first signal output from the electronic processor to at least one selected from a group consisting of the first battery pack and the second battery pack, and alter a second signal received by the electronic processor from at least one selected from the group consisting of the first battery pack and the second battery pack.

Yet another embodiment discloses an electrical device system including a device housing and an adapter. The device housing includes a first battery pack receptacle and an electronic processor. The adapter is configured to be received by the first battery receptacle. The adapter includes a second battery receptacle configured to receive a first battery pack, a third battery pack receptacle configured to receive a second battery pack, and bypass circuitry. The bypass circuitry is configured to bypass the second battery pack receptacle when the second battery pack is not present in the second battery pack receptacle In some embodiments, an electrical combination may generally include an electrical device (for example, a power tool) and two or more battery packs connected in series and operable to power the electrical device. The power tool may include a circuit with an electronic processor and may be operable to alter voltage signals to an input of the battery pack(s) and to an input of the processor. In some constructions, the circuit may include optocouplers operable to alter the voltage signals.

In some embodiments, the circuit of the electrical device (for example, the power tool) may include a switch with a transistor (for example, a P-type bipolar junction transistor (BJT)) and one or more diodes and may be operable to allow use of the power tool with fewer than all battery packs connected or operational (for example, with only one battery pack connected/operational).

In yet other embodiments, an electrical device (for example, a power tool) may generally include a first interface operable to receive a first battery pack, a second interface operable to receive a second battery pack and a circuit operable to receive power from the first battery pack and the second battery pack, the first battery pack and the second battery pack being connected in series. The circuit may include an electronic processor and optocouplers and may be operable to alter voltage signals to an input of the battery pack(s) and to an input of the processor. The circuit may include a switch with a transistor (for example, a P-type BJT) and one or more diodes and may be operable to allow use of the power tool with fewer than all battery packs connected or operational (for example, with only one battery pack connected/operational).

In a further embodiment, an electrical combination may generally include an electrical device (for example, a power tool), an adapter and two or more battery packs connected in series and operable to power the electrical device through the adapter. The adapter may include a first interface operable to receive a first battery pack, a second interface operable to receive a second battery pack, a third interface operable to connect to the power tool, and a circuit operable to receive power from the first battery pack and the second battery pack and to output power to the power tool, the first battery pack and the second battery pack being connected in series.

The circuit may include an electronic processor and optocouplers and may be operable to alter voltage signals to an input of the battery pack(s) and to an input of the processor. The circuit may include a switch including a transistor (for example, a P-type BJT) and one or more diodes and may be operable to allow use of the power tool with fewer than all battery packs connected or operational (for example, with only one battery pack connected/operational).

FIG. 1 schematically illustrates an electrical combination including a battery-powered electrical device, such as a portable power tool 100, an outdoor tool, another motorized electrical device, a non-motorized electrical device, etc., powered by multiple (e.g., two shown) series-type connected battery packs 104, 108. The electrical device will be described in terms of a battery-powered power tool 100. The power tool 100 includes a housing 112 defining a number (e.g., two shown) of battery pack interfaces 116, 120 operable to connect (e.g., electrically and, in the illustrated construction, mechanically) with the battery packs 104, 108, respectively. In other constructions (not shown), the power tool 100 may be powered by more than two battery packs and may have a corresponding number of battery pack interfaces.

Each battery pack 104, 108 includes a housing 124 defining a pack interface (not shown) and supporting a number of battery cells (not shown). The pack interface includes a pack terminal block (not shown) including pack power terminals electrically connected to the cells and, in some constructions, one or more pack communication terminals. Each battery pack 104, 108 also includes a battery electronic processor (not shown) operable to, for example, control operation of the battery pack 104, 108. Each battery pack 104, 108 provides discharge current to a battery-powered electrical device 100 and receives charging current from a battery charger (not shown) through the terminal block.

Each battery cell may have a nominal voltage between 3 volts (V) and 5 V and may have a nominal capacity between 3 Amp-hours (Ah) and 5 Ah. The battery cells may be any rechargeable battery cell chemistry type, such as, for example, Lithium (Li), Lithium-ion (Li-ion), other lithium-based chemistry, nickel-cadmium (NiCd), nickel-metal hydride (NiMH), etc.

The battery pack 104, 108 may include one or more battery cell strings connected in a parallel-type connection, each having a number (e.g., five or more) of battery cells connected in a series-type connection to provide a desired discharge output (e.g., nominal voltage (e.g., between about 15 V and about 21 V (about 18 V to about 20.5 V, as illustrated)) and current capacity). For example, the battery pack 18 may include "5S1P", "5S2P", "5S3P", etc., configurations. In other embodiments, other combinations of battery cells are also possible to provide other discharge output characteristics. In the illustrated construction, the battery packs 104, 108 have a nominal voltage of about 18 V and are connected in a series-type connection to provide between about 30 V and about 42 V (about 36 V to about 41 V, as illustrated) to the power tool 100.

Similar battery packs 104, 108 are described and illustrated in U.S. patent application Ser. No. 16/045,513, filed Jul. 25, 2018, entitled "HIGH-POWER BATTERY-POWERED SYSTEM," the entire contents of which are hereby incorporated by reference.

Figure 2:
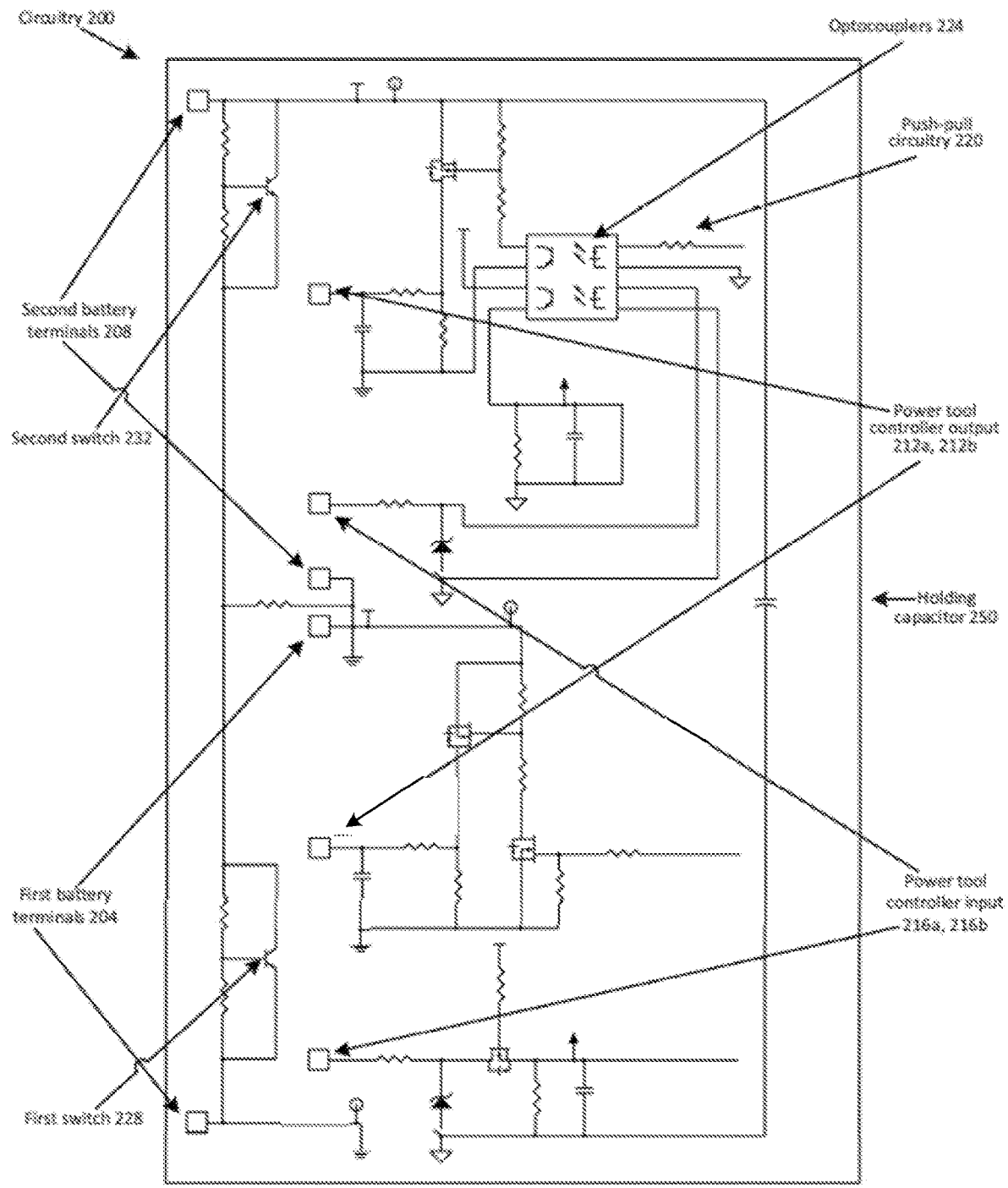
FIG. 2 is a diagram of a circuit of the electrical device according to one embodiment of the invention.

Referring to FIG. 2, the power tool 100 includes a circuit 200 operable to receive power from the series-type connected battery packs 104, 108 and supply power to a load (e.g., a motor (not shown)) of the tool 100. Each interface 116, 120 includes a tool terminal interface with power terminals 204, 208, respectively, and one or more communication terminals 212, 216 (input and output, respectively) for communication of information between the power tool 100 and each connected battery pack 104, 108. The tool terminals 204-216 are electrically connectable with the corresponding pack terminals of the supported battery pack 104, 108.

The illustrated circuit 200 includes a push-pull circuit 220, with optocouplers 224, and switches 228, 232, each of which includes a transistor (e.g., a P-type bipolar junction transistor (BJT)) in parallel with resistors. A motor holdup or holding capacitor 250 is in parallel with the terminals 204, 208, for power supply filtering, ensuring safe operation of the power tool 100, etc.

A power tool electronic processor 260 is operable to communicate simultaneously and/or sequentially with the battery packs 104, 108. The tool processor 260 is operable to receive and control operation of the power tool 100 in accordance with discharge signals/commands from the battery pack 104, 108.

The tool processor 260 communicates voltage levels with the push-pull circuit 220 and the interfaces 116, 120. The tool processor 260 receives communication signals from each battery pack 104, 108 through the input terminals 212 and transmits communication signals to each battery pack 104, 108 through the output terminals 216.

The push-pull circuit 220 is operable to convert the output communication voltage of the power tool 100 to an input communication voltage of each battery pack 104, 108. The optocouplers 224 electrically isolate each interface 116, 120 and the tool processor 260.

The tool processor 260 communicates with a high-side battery pack at a higher reference voltage than the digital logic of the power tool 100 or a low-side battery pack at a lower reference voltage than the digital logic of the power tool 100. To negotiate discharge requests with a low-side battery pack, the tool processor 260 uses the push-pull circuit 220 to alter the voltage signals and provide the appropriate voltage level to the input of the battery pack 104, 108 and the input of the tool processor 260.

The tool input voltage signal (the DC signal) at the interface 116, 120 and at the tool processor 260 may, in some embodiments, range from about 0 V to about 3 V. The tool output voltage signal (the DP signal) may, in some embodiments, range from about 0 V to about 21 V at the battery interface and from about 0 V to about 3.3 V at the tool processor 260. In this way, in some embodiments, if about 3 V is applied by the output communication voltage of the power tool 100, output communication voltage will be amplified from about 3.3 V to about 21 V at the input of the battery pack 104, 108 by the push-pull circuit 220.

The tool processor 260 is operable to communicate with the high-side battery pack using a change in reference in tandem with the push-pull circuit 220. The DC signal may range from about 16 V to about 24 V at the interface 116, 120 and from about 0 V to about 3 V and the tool processor 260. The DP signal may range from about 16 V to about 42 V at the interface 116, 120 and from about 0 V to about 3.3 V at the tool processor 260.

The reference difference between the interface 116, 120 and the tool processor 260 may be realized through an electronically isolating element (e.g., the optocouplers 224) with isolated sides referenced to ground. In other words, one isolated side may be referenced to the ground of the tool processor 260, and the other isolated side may be referenced to the ground of the interface 116, 120. The DP signal is amplified from about 3.3 V to about 21 V via the push-pull circuit 220 on the interface side of the optocouplers 224.

Signals from the battery packs (e.g., four discrete signals from the two battery packs 104, 108) route to the tool processor 260. The DC signals serve as inputs, and the DP signals serve as outputs. In some embodiments, open link communication may only be supported on the low-side battery pack. In such an embodiment, if supported on the high-side battery pack, communication may be at a slower rate.

In the illustrated embodiment, circuitry 200 may further include bypass circuitry including switches 228, 232. Each switch 228, 232 may include a transistor (e.g., a P-type BJT) and two resistors operable to bypass terminals of a low-power or missing battery pack. The switches 228, 232 allow the power tool 100 to operate with fewer than all battery packs (e.g., one battery pack 104 or 108) connected or operational or with all battery packs (e.g., the two battery packs 104, 108) connected and operational.

When one battery pack (e.g., the battery pack 104) is connected without the other battery pack (e.g., the battery pack 108), the first switch 228 turns on, allowing power to flow through the first switch 228, while bypassing the terminals 208 for the other battery pack 108, and providing charging power to the holding capacitor 250. When the other battery pack (e.g., the battery pack 108) is connected without first battery pack (e.g., the battery pack 104), the second switch 232 turns on, allowing power to flow through the second switch 232, while bypassing the terminals 204 for the first battery pack 104, and providing charging power to the holding capacitor 250. When a battery pack is connected in a parallel-type connection with the transistor of the switch 228 or 232, that transistor turns off and no longer conducts in either direction.

The holding capacitor 250 may be charged to an intermediate voltage to lower the risk of unwanted electrical discharge when one battery pack is not installed on the power tool 100. In some embodiments, a conductor is placed across the power terminals of the open interface without an associated battery pack. By allowing the holding capacitor 250 to charge, the transistor (e.g., the P-type BJT) may provide a touch-safe/spark limit aspect. In some instances, the holding capacitor 250 may be charged to the potential of the installed battery pack.

Charging the holding capacitor 250 may provide digital logic power supply filtering by, for example, smoothing out the ripple contained in the pulses of DC provided to the power supply. Charging the holding capacitor 250 may act as a motor inverter bus voltage transient suppression device, for containing an overvoltage condition of the battery packs 104, 108. In some embodiments, the holding capacitor 250 has a capacitance ranging from about 10 uF to about 1 mF.

Figure 3:
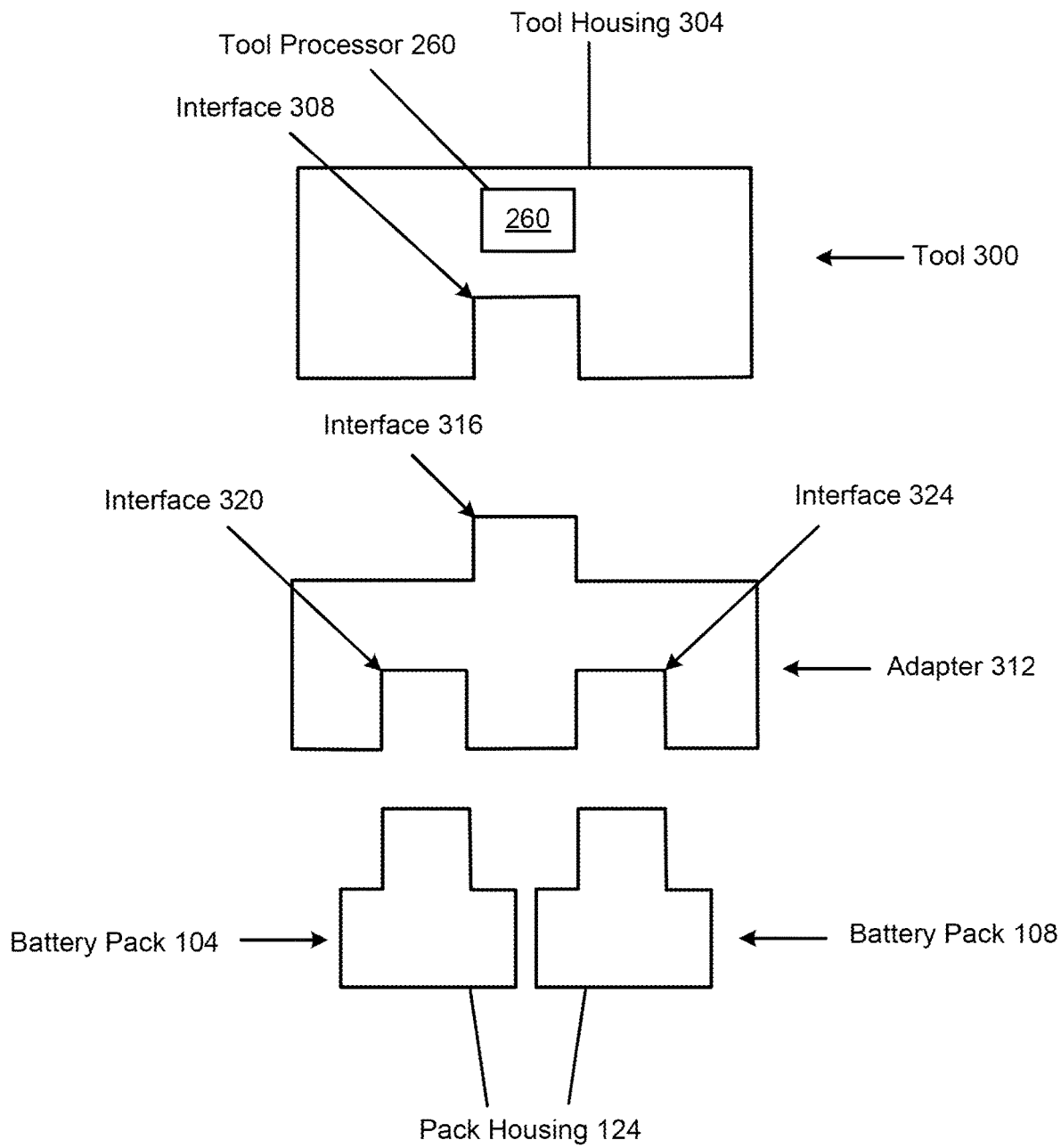
FIG. 3 is an electrical combination including an electrical device, such as a power tool, multiple battery packs and an adapter operable to connect the battery packs to the electrical device.

FIG. 3 illustrates an alternative construction of an electrical combination including a high voltage electrical device (e.g., a high voltage power tool 300) having a tool housing 304 defining a single battery pack interface 308, an adapter 312 with a device interface 316 and a number (e.g., two shown) battery interfaces 320, 324, and multiple (e.g., two shown) lower voltage battery packs 104, 108.

In the illustrated construction, the high voltage power tool 300 may be operable at between about 30 V and about 42 V (about 36 V to about 41 V, as illustrated). The lower voltage battery packs 104, 108 may have a nominal voltage between about 15 V and about 21 V (about 18 V to about 20.5 V, as illustrated).

The adapter 312 may include a circuit (not shown) similar to the circuit 200, described above, operable to receive power from the connected battery packs 104, 108 through the interfaces 320, 324. The adapter circuit is operable to output power from the battery packs 104, 108 to the power tool 300 through the interfaces 308, 316.

Thus, embodiments may provide, among other things, an electrical combination including an electrical device (e.g., a portable power tool) powered by a number of series-connected battery packs and control circuitry for the electrical device.

Although the application has been described in detail with reference to certain preferred embodiments, variations and modifications exist within the scope and spirit of one or more independent aspects of the application as described.

One or more independent features and/or independent advantages of the application may be set forth in the claims.

What is claimed is:

1. An electrical device comprising:
   a first battery pack receptacle configured to receive a first battery pack;
   a second battery pack receptacle configured to receive a second battery pack, the second battery pack electrically connected in a series-type configuration with the first battery pack; and
   bypass circuitry, the bypass circuitry configured to
      bypass the second battery pack receptacle when the second battery pack is not present in the second battery pack receptacle,
   wherein the electrical device is configured to be received by a third battery pack receptacle included in a housing of a power tool, and
   wherein the electrical device is configured to remain operable to allow use of the power tool while bypassing the second battery pack receptacle.

2. The electrical device of claim 1, wherein the bypass circuitry includes a transistor.

3. The electrical device of claim 1, wherein the bypass circuitry includes a diode.

4. The electrical device of claim 1, further comprising a motor included in the housing of the power tool.

5. The electrical device of claim 4, wherein the motor is configured to receive power from at least one selected from the group consisting of the first battery pack and the second battery pack.

6. The electrical device of claim 1, wherein the first battery pack and the second battery pack each have a nominal voltage in the range of 15V to 21V.

7. An electrical device system comprising:
   a housing of a power tool including:
      a first battery pack receptacle, and
      an electronic processor; and
   an adapter configured to be received by the first battery pack receptacle, the adapter including:
      a second battery pack receptacle configured to receive a first battery pack,
      a third battery pack receptacle configured to receive a second battery pack, and bypass circuitry configured to
         bypass the second battery pack receptacle when the second battery pack is not present in the second battery pack receptacle,
      wherein the adapter is configured to remain operable to allow use of the power tool while bypassing the second battery pack receptacle.

8. The system of claim 7, wherein the bypass circuitry includes a transistor.

9. The system of claim 7, wherein the bypass circuitry includes a diode.

10. The system of claim 7, wherein the housing of the power tool further includes a motor configured to receive power from at least one selected from the group consisting of the first battery pack and the second battery pack.

11. The system of claim 7, wherein the adapter is positioned between the housing of the power tool and the first and second battery packs.

12. The electrical device of claim 7, wherein the first battery pack and the second battery pack each have a nominal voltage in the range of 15V to 21V.

13. A power tool comprising:
   a housing of the power tool;
   a first battery pack receptacle configured to receive a first battery pack;

a second battery pack receptacle configured to receive a second battery pack, the second battery pack electrically connected in a series-type configuration with the first battery pack; and bypass circuitry, the bypass circuitry included within the housing of the power tool and configured to:
   bypass the second battery pack receptacle when the second battery pack is not present in the second battery pack receptacle,
   wherein the power tool is configured to remain operable while bypassing the second battery pack receptacle.

14. The tool device of claim 13, wherein the bypass circuitry includes a transistor.

15. The tool device of claim 13, wherein the bypass circuitry includes a diode.

16. The tool device of claim 13, further comprising a third battery pack receptacle configured to receive a third battery pack.

17. The tool device of claim 13, further comprising a motor included in the housing of the power tool.

18. The tool device of claim 17, wherein the motor is configured to receive power from at least one selected from the group consisting of the first battery pack and the second battery pack.

19. The tool device of claim 13, wherein the first battery pack and the second battery pack each have a nominal voltage in the range of 15V to 21V.

\* \* \* \* \*